United States Patent

Arikawa et al.

[15] 3,669,335
[45] June 13, 1972

[54] BACKING STRIP FOR SINGLE SIDE WELDING OF STEELS

[72] Inventors: Masayasu Arikawa; Motomi Kano; Katsuro Iio; Toshio Tanaka, all of Kanagawa-ken, Japan

[73] Assignee: Kobe Steel Ltd., Kobe-shi, Hyogo-ken, Japan

[22] Filed: July 14, 1969

[21] Appl. No.: 841,420

[30] Foreign Application Priority Data

July 26, 1968 Japan..................................43/53151

[52] U.S. Cl.....................................228/50, 29/496, 148/23
[51] Int. Cl...................................................B23k 5/22
[58] Field of Search..............148/23, 26; 264/290 R, 290 T, 264/342, 230; 228/50; 29/182.2, 191.2, 496; 75/94; 53/198 R

[56] References Cited

UNITED STATES PATENTS

| | | | |
|---|---|---|---|
| 2,331,937 | 10/1943 | Schreiner | 113/59 |
| 2,616,384 | 11/1952 | McBride | 113/110 |
| 2,820,427 | 1/1958 | Chyle et al. | 113/111 |
| 2,916,001 | 12/1959 | Chyle et al. | 113/111 |
| 3,417,176 | 12/1968 | Anderson et al. | 264/290 X |
| 3,093,448 | 6/1963 | Kirkpatrick et al. | 264/342 X |

Primary Examiner—John F. Campbell
Assistant Examiner—R. J. Craig
Attorney—Wenderoth, Lind & Ponack

[57] ABSTRACT

The disclosure is an improved type of a backing strip particularly adapted for use in the single side welding of steels. The means of the invention is suitable for welding operations such as at a high location or in the field and permits the welding of a curved surface or of complex shapes owing to the flexibility afforded by its special design. The backing strip embodied in this disclosure consists of a cylindrical body made of a heat contractive synthetic plastic with flux filled therein, the former of which is designed to shrink by heat to thereby enclose the flux which consists of powder or grain metal oxides, metal carbonates or the like.

Upon application of the said backing strip to the undersurface of the welding groove, there is provided flexibility sufficient to compensate for the misalignment in the undersurfaces of the welding groove or in the curved surface, thus presenting superior adaptability over conventional methods.

4 Claims, 6 Drawing Figures

PATENTED JUN 13 1972 3,669,335

MASAYASU ARIKAWA,
MOTOMI KANO,
katsuro Iio and
TOSHIO TANAKA,

INVENTOR s

BY Wenderoth Lind +

Ponack ATTORNEY s

BACKING STRIP FOR SINGLE SIDE WELDING OF STEELS

SUMMARY OF THE INVENTION:

This invention is related to a backing strip used for single side butt welding of base steels and is applied from one side of the metal surfaces, particularly to such a backing strip suitable for the single side welding of such joints as have curved surfaces and complicated shapes and further to such welding in field operations where the height of the welding location does not permit the use of a large size backing device.

In the single side arc welding of steels, it has been a common practice to weld the steel plate with copper plate, flux, or a combination of copper plate and flux attached to the under side of the weld zone.

Among these mentioned means, however, the copper plate backing practice and the flux backing practice are both unsuitable for such applications as that of field operation welding wherein groove precision is poor. The copper plate and flux combination practice, wherein the copper plate with the powdery flux scattered on the surface thereof is attached to the under-side of the weld groove, is advantageous because of the wider range of its groove precision, whereas, in the application for the foregoing field operation, this practice is not recommendable because of possible spilling of the flux scattered on the copper backing plate during transportation or because of leakage of the under side weld beads due to lack of flux feed to the joint to which the copper backing plate is attached.

To improve these disadvantages, there has been adapted a method wherein a solid flux of a given thickness is used instead of the powdery flux attached on the copper strip. This method prevents spilling of the flux or the lack of the flux feed to the weld joints. On the other hand, this provides other disadvantages such as difficulty in aligning the solid flux with the curved surfaces due to its poor flexibility and the complexity in attaching the solid flux to the surface of the copper plate due to the fact that long lengths of solid flux are not available as well as due to poor adhesion in case of misaligned undersurfaces of the groove.

A primary object of this invention is to provide a backing strip free from such difficiencies, and more particularly such a backing strip which can be used in field operations at a high location and which can be applied efficiently to the single side welding of the joints with curved surfaces and complex shapes. It is a further object of the present invention to provide a backing strip which provides wider weld groove precision, prevents spilling of the flux during transportation, precludes leakage of the back side weld beads due to lack of the flux, and provides the best contact of the flux due to its flexibility, despite the presence of misalignment or curved surfaces, thus presenting a backing strip for single side welding which is best suited for a variety of welding applications.

To achieve the foregoing objects, this invention provides a backing strip made of a thin wall cylinder of heat-contractive synthetic plastic (in the form of a film), into which welding flux in the form of powder, grain or a solid lump is filled, and which is then shrunk by heat applied to the whole body thereof.

The heat contractive synthetic plastics referred to herein are vinyl-plastics such as polyvinyl chloride, polyethylene, polypropylene, or polystyrene, or heat plasticizing synthetic plastics such as cellophane. The said cylindrical film made of these synthetic plastics has been expanded beforehand in the radial and length directions, and is intended to provide the required diameter and length by way of the subsequent reheating. The thickness of the synthetic plastic film for constructing the cylindrical body ranges between 0.001 and 0.03 mm, in general, which later will be 0.02 to 0.04 mm after reheating. The cylindrical body is so fabricated as to provide the diameter and length corresponding to the cross sectional area of the required backing strip and is later shrunk to the required diameter and length at a given heat contraction ratio. The flux used for this invention may be composed of a single or arbitrarily combined constituents used widely for welding flux, that is, one or a combination of metal oxides such as silica, rutile, alumina or magnesia, or metal carbonates such as limestone or dolomite, otherwise fluoride such as fluorite, and in some cases, iron powder or iron alloy powder can be added thereto, as necessary.

In either case, this invention does not attempt to deal with the composition or constituents of the flux, and these factors should be determined in actual applications as necessary. When these fluxes in either powder or grain form are filled into a cylindrical body of heat contractive film, then formed to the shapes or dimensions to meet welding conditions, and in turn heat-set, or heat shrunk at a temperature which causes the shrinkage of the film, then, even very fluid flux will solidify with the cross section of the cylinder, and thus will maintain its desired original shape. In addition, even though the shape of the cross section may be confined, there remains some flexibility in the longitudinal or lateral direction, thereby permitting alignment of the backing strip with the curvature or misalignment of the weld zone.

It is further possible to have solidified beforehand the flux which will be filled into the cylindrical body. Solidification of the flux can be easily be accomplished by adding to the flux materials a proper amount of binders such as water glass, heat curing plastics or phenol plastics to form the required shape, and finally drying by the application of heat.

It is also possible to attach a plate made of refractory material to the inner side of the cylindrical body in which the flux is to be filled. Used for such refractory materials, other than copper plate, are the common refractory materials such as powdery or grain shaped mixtures of magnesia silica, zirconia, or asbestos.

In addition to this, it is possible to combine the flux with other heat resistant core materials. For such core materials, a tape, matt, cloth or fiber made of glass or other inorganic fiber can be used.

Either such refractory plates or core materials will be filled, together with the flux, into the cylindrical body, and will in turn be integrally solidified by the application of heat. There is no need to impose any limitation on the width of the backing strip, as far as the width thereof covers that of the welding groove lines in the actual application, however, generally speaking, the proper range would be from 40 through 100 mm. The thickness of the flux to form an appropriate underslag should be such that the flux be located between the bottom of the base metal and a holding member or refractory, so as to provide the proper height of under-bead and slag, which generally ranges between 2.5 and 4.5 mm.

The backing strip embodied in this invention may be held by a specifically prepared copper strip or may be set directly on the bottom surface of the steel plate by means of adhesive tapes.

There is no danger of flux spilling during transportation or during backing strip preparation, because, in the backing strip embodied in this invention, the flux composing a backing strip is covered in it's entirety with the synthetic plastic film. In addition, the said backing strip need not to be dried at the time of application nor could it possibly be subject to deterioration due to absorbing moisture from the air during storage, because the whole surface of the strip is covered with the synthetic plastic film. The backing strip, if powdery or grain shaped flux is used, can be provided with suitable flexibility, and hence this can be applied to welding zones including curved or misaligned surfaces. As is evident from the foregoing, the backing strip embodied in this invention is free of the defects of conventional backing strips of this type and provides better backing features and is applicable to field welding operations with ease.

Further objects and additional advantages of the invention will become apparent from the following detailed description and drawings wherein:

BRIEF DESCRIPTION FOR THE DRAWINGS

FIG. 1 is the most foundamental example of this invention showing the construction of the flux 1 covered with synthetic plastic film 2. The shape of the cross section is rectangular with both ends thereof rounded off.

FIG. 2 is the backing strip of this invention used in an actual application, wherein the said strip is attached to the under-surface of welding grooves of base metals 3—3 and set thereon using adhesive tape 4.

Figure 1:
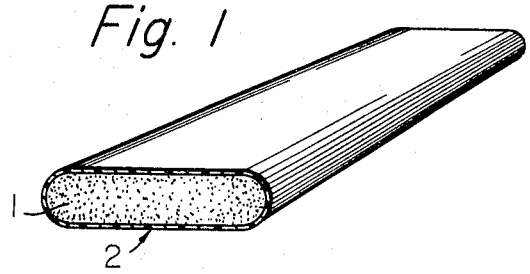
FIG. 1 is a sectional view taken from the oblique direction, of a backing strip embodying the most foundamental embodiment of the invention.
Figure 2:
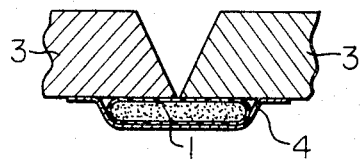
FIG. 2 is a cross sectional view showing the backing strip in actual use.
Figure 3:
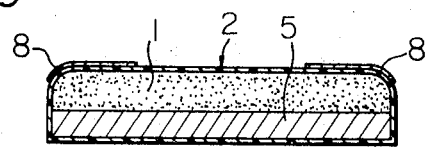
FIG. 3 to FIG. 6 are cross sectional views showing further embodiments of the invention.

FIG. 3 show an embodiment wherein the whole body of the flux 1 is covered with film 2 with a refractory plate 5 laid on the surface of the flux opposite the backing surface, and the flux 1 is adapted to be in contact with the base metals.

Figure 4:
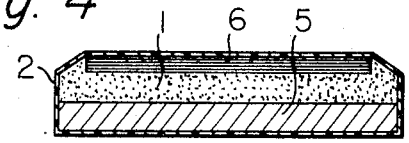
Figure 5:
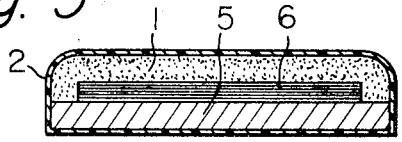

FIG. 4 and FIG. 5 show embodiments with heat resisting core materials 6 used in conjunction with the flux 1 and refractory plate 5, and the said core materials 6 may be positioned on the upper surface of the flux 1 (see FIG. 4) or on the lower surface thereof (see FIG. 5).

Figure 6:
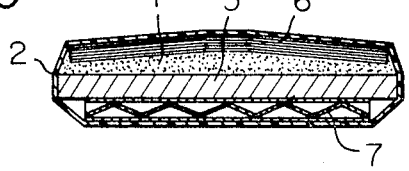

FIG. 6 shows an embodiment wherein a sheet of corrugated cardboard 7 is attached to the under-surface of refractory plate 5 for the purpose of providing protection or cushion, and the flux 1, refractory plate 5 and heat resisting core materials 6 are all covered with film 2.

It would be a matter of course to say that, in addition to the foregoing, such methods could be adopted, as necessary, wherein the backing strip, as shown in FIG. 3, is attached to the back surface of the base metal using the adhesive tape 8 adhered to both the left and right sides of the surface of the strip, or wherein the upper surface of the backing strip, as shown in FIG. 6, is provided with a proper degree of angle so as to conform with the back surface of a base metal formed at an angle.

The examples of the actual applications of this invention will be shown as follows:

EXAMPLE 1

| | |
|---|---|
| Iron powder | 30% |
| Rutile | 25 |
| Fluorite | 10 |
| Zirconia Sand | 10 |
| Magnesia Clinker | 10 |
| Silica | 5 |
| Fe—Si | 10 |

Those constituents as shown above were in turn filled into a bag of polypropylene of 20 μ thickness, then formed to 70 mm width and 4 mm thickness, and charged into a furnace with the temperature set to the range of 50° to 60° C. to provide heat shrinkage to the polypropylene bag so as to enclose the flux therein. The thus formed backing strip was then attached to the back surface of a welding groove with the adhesive tape. Welding then took place. The welding conditions applied to this example were such that the amperage ranged between 130 and 140 A and the welding position was flat.

EXAMPLE 2:

| | |
|---|---|
| Iron powder | 70% |
| Fluorite | 15 |
| Magnesia clinker | 10 |
| Al Powder | 4 |
| Phenole plastics | 1 |

Those constituents as shown above were in turn scattered on an asbestos plate 5 mm wide and 70 mm thick, then heated to a temperature ranging between 100° and 150° C., solidified using fused phenol plastics, charged into a bag of polypropylene together with the asbestos plate, heated to a temperature of 50° to 60° C. to provide heat shrinkage to the polypropylene bag to enclose the solidified flux and asbestos plate therein. The thus formed backing strip was then attached to the under surface of the welding groove, and the base metals were welded. The welding conditions applied to this example were such that the amperage, voltage, and welding rate for the first layer were 450 A, 31 V, and 30 cm/min, respectively, and that the amperage, voltage, and welding rate for the second layer were 450 A, 33 V, and 25 cm/min, respectively.

EXAMPLE 3

| | |
|---|---|
| Iron powder | 60% |
| Rutile | 10 |
| Fluorite | 5 |
| Zirconia sand | 5 |
| Magnesia clinker | 10 |
| Fe—Si | 5 |
| Fe—Mn | 5 |

The constituents shown above were provided in the form of grains of the following percentage of mesh sizes: 24–32 mesh (1.7%), 32–48 mesh (8.8%), 48–65 mesh (13.0%), 65–100 mesh (17.3%), 100–145 mesh (33.1%), 145–200 mesh (12.5%), 200 mesh and the under (13.4%), and they were added to water glass (3%), then laid together with 10 sheets of 0.25 mm thick glass tapes made of glass fibers on a 4 mm × 70 mm asbestos plate to stand for a length of time, then filled into a polypropylene bag, heated to a temperature ranging from 50° to 60° C. to provide heat shrinkage to the polypropylene bag to form a backing strip. The backing strip was then attached to the under surface of the welding groove by means of adhesives coated on the surface of polypropylene bag, and submerged welding of the base metals took place. The welding conditions applied to this example were such that the flux used was of 12 × 48 mesh, the wire was of 4.8 diameter, the amperage 1100A, voltage 36 V, and the welding rate 28 cm/min.

What is claimed is:

1. A backing strip used for single side welding, comprising a quantity of flux, a refractory material positioned on the under surface of said flux, heat resisting flexible core materials positioned on the upper surface of said flux, said core materials being glass fiber tape, a cylindrical body made of heat contractive synthetic plastic film surrounding and heat shrunk to enclose said flux, said refractory material and said heat resisting core materials as a whole.

2. A backing strip as claimed to claim 1 wherein said flux is powder.

3. A backing strip as claimed in claim 1, wherein said flux is in the form of grains.

4. A backing strip as claimed in claim 1 wherein said flux is preformed and of a solid.

* * * * *